United States Patent [19]
Borshchevsky

[11] Patent Number: 6,058,174
[45] Date of Patent: May 2, 2000

[54] AUTOMATIC INTERCOM SYSTEM FOR BUILDINGS

[76] Inventor: Max Borshchevsky, 2321 63rd St., Apartment 2R, Brooklyn, N.Y. 11204

[21] Appl. No.: 09/281,226

[22] Filed: Mar. 30, 1999

[51] Int. Cl.[7] ................................................. H04M 1/60
[52] U.S. Cl. ............................................. 379/167; 379/171
[58] Field of Search .................... 379/158, 159, 379/167, 170, 201, 164, 160, 161, 162, 163, 171

[56] References Cited

U.S. PATENT DOCUMENTS

| | | | |
|---|---|---|---|
| D. 394,653 | 5/1998 | Kato et al. | D14/159 |
| 3,484,561 | 12/1969 | Matthews | 379/102.06 |
| 3,532,820 | 10/1970 | Holm | 379/102.06 |
| 3,665,116 | 5/1972 | Holstrom | 379/167 |
| 4,130,728 | 12/1978 | Grauel | 379/167 |
| 4,188,511 | 2/1980 | Smith et al. | 379/158 |
| 4,196,317 | 4/1980 | Bartelink | 379/159 |
| 5,148,468 | 9/1992 | Marrick et al. | 379/167 |
| 5,309,510 | 5/1994 | Berndt | 379/167 |
| 5,384,838 | 1/1995 | Hoffman | 379/167 |
| 5,586,542 | 12/1996 | Borshchevsky et al. | 379/171 |
| 5,612,994 | 3/1997 | Chen | 379/167 |
| 5,657,380 | 8/1997 | Mozer | 379/167 |
| 5,754,637 | 5/1998 | Choi | 379/167 |
| 5,774,039 | 6/1998 | Housley | 379/167 |
| 5,905,787 | 5/1999 | Stuart | 379/167 |
| 5,966,432 | 10/1999 | Buckler et al. | 379/167 |
| 6,011,839 | 12/1978 | Friedli et al. | 379/167 |

*Primary Examiner*—Curtis A. Kuntz
*Assistant Examiner*—Rexford N. Barnie
*Attorney, Agent, or Firm*—Richard C. Litman

[57] ABSTRACT

A semi-automatic or a fully automatic intercom system. These intercom systems are hardwired intercom systems which cannot be used with telephone lines. The semi-automatic intercom system can be used with any kind of lobby panel including a lobby panel equipped with a keypad and an electronics board. The fully automatic intercom system according to the invention can be used only with a lobby panel equipped with a keypad and an electronics board. The fully automatic system can automatically disconnect a shorted out apartment unit from the system and restore the building to service immediately.

7 Claims, 3 Drawing Sheets

AUTOMATIC INTERCOM SYSTEM FOR BUILDINGS

BACKGROUND OF THE INVENTION

1. Field of the Invention

The present invention relates to semi-automatic and fully automatic building intercom systems.

2. Description of the Related Art

It has been an increasing concern by apartment builders to provide an apartment intercom/door release system that not only is secure, but also reliable. As apartment buildings with 200 apartments or more become commonplace, it is extremely burdensome and time consuming to trace every wire in an intercom system to locate a fault. In addition, the entire intercom system may be out of order until the fault is found.

The related art is represented by the following patents of interest.

U.S. Design Pat. No. 394,653, issued on May 26, 1998 to Tetuaki Kato et al., shows an ornamental design for an intercom sub-station. Kato et al. do not suggest an automatic intercom system according to the claimed invention.

U.S. Pat. No. 3,484,561, issued on Dec. 16, 1969 to John T. Matthews, describes a combination telephone-intercom and door release system. Matthews does not suggest an automatic intercom system according to the claimed invention.

U.S. Pat. No. 3,532,820, issued on Oct. 6, 1970 to Norbert Holm, describes an intercom system employing a matrix system having a telephone at each junction that allows a visitor to select and call a suite, carry on a two-way private conversation with the tenant, and that allows the tenant to activate a remote door release. Holm does not suggest an automatic intercom system according to the claimed invention.

U.S. Pat. No. 3,665,116, issued on May 23, 1972 to Allan Holstrom, describes an intercom system which requires only two wires to transmit signals between a speaker-microphone unit located at a central or foyer station, and any one of a plurality of such units located at apartments remote from the foyer station, as well as to transmit a door unlatching signal from any remote unit to a release mechanism at the foyer station. Holstrom does not suggest an automatic intercom system according to the claimed invention.

U.S. Pat. No. 4,188,511, issued on Feb. 12, 1980 to Maurice I. Smith et al., describes a multi-link telephone intercom system including a separate link selector for each link and a separate link scanner for each subscriber station. Smith et al. do not suggest an automatic intercom system according to the claimed invention.

U.S. Pat. No. 4,196,317, issued on Apr. 1, 1980 to Everhard H. B. Bartelink, describes a telephone intercom system which provides combined telephone and intercommunication services to telephone subscribers with multiple subscriber sets. Bartelink does not suggest an automatic intercom system according to the claimed invention.

U.S. Pat. No. 5,568,542, issued on Oct. 22, 1996 to Max Borshchevsky et al., describes a self-correcting intercom system with circuitry to detect faults within the circuitry and reset the system to a pre-fault condition on the occurrence of a fault. Borshchevsky et al. do not suggest an automatic intercom system according to the claimed invention.

None of the above inventions and patents, taken either singularly or in combination, is seen to describe the instant invention as claimed.

SUMMARY OF THE INVENTION

The present invention relates to semi-automatic and fully automatic intercom systems. These intercom systems are hardwired intercom systems which cannot be used with telephone lines. The semi-automatic intercom system can be used with any kind of lobby panel including a lobby panel equipped with a keypad and an electronics board. The fully automatic intercom system according to the invention can be used only with a lobby panel equipped with a keypad and an electronics board. The fully automatic system can automatically disconnect a shorted out apartment unit from the system and restore the building to service immediately.

Accordingly, it is a principal object of the invention to provide a hardwired semi-automatic intercom system.

It is another object of the invention to provide a hardwired fully automatic intercom system.

It is a further object of the invention to provide a fully automatic intercom system with a fault protection circuit that will reset the system to a pre-fault condition on the occurrence of a short circuit, so that the rest of the system will continue to function.

It is an object of the invention to provide improved elements and arrangements thereof in a semi-automatic or fully automatic intercom systems for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention relates to semi-automatic and fully automatic intercom systems. The operation of semi-automatic and fully automatic intercom systems according to the invention will be described with reference to FIGS. 1 through FIG. 3. These intercom systems are hardwired intercom systems which cannot be used with telephone lines. The semi-automatic intercom system can be used with any kind of lobby panel including a lobby panel equipped with a keypad and an electronics board. The fully automatic intercom system according to the invention can be used only with a lobby panel equipped with a keypad and an electronics board. The fully automatic system can automatically disconnect a shorted out apartment unit from the system and restore the building to service immediately.

Figure 1:
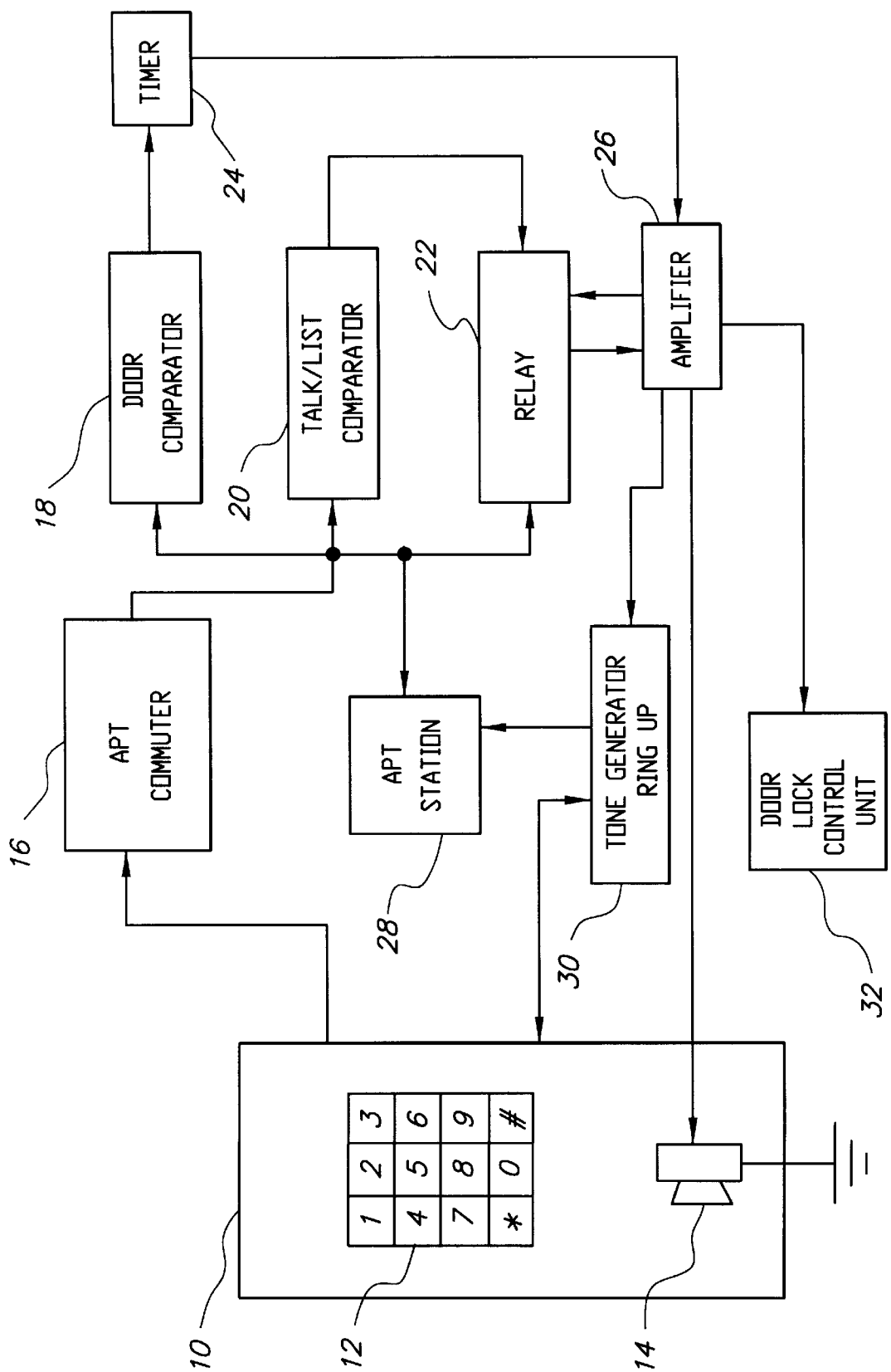
FIG. 1 is a block diagram of a semi-automatic intercom system according to the present invention, illustrating various elements of the system.

FIG. 1 shows in block diagram format an electronics circuit for a semi-automatic intercom system according to the invention which alternatively links an entrance panel 10 with an array of apartments. Each apartment has an apartment station 28 which is either a wall mounted intercom speaker station unit or a handset apartment station unit. In either case, the station unit is hardwired into the intercom system and includes a talk/listen push button and a door push button. The entrance panel 10 is provided with a keypad 12 and a speaker 14. The speaker 14 as shown as a two way speaker, but could also be any electronic sound conversion means including a separate speaker and microphone which can convert sound to electric signals and convert electric signals into sound. For electrical considerations, the component chosen for the speaker should be selected with the regard to the apartment station in use. The speaker 14 in the entrance panel and the speaker in the apartment station are both hardwired intercom speaker units.

To connect the entrance panel 10 with an apartment station, according to the present invention, a user depresses numbers on the keypad 12 which correspond to a particular apartment to initiate the semiautomatic intercom system. The numbers which the user enters into the system may be either the apartment number itself, or a published code number which has a one to one correspondence with a particular apartment. If the intercom has a "sleep" mode, where the intercom is normally dormant to reduce the power consumption of the intercom system, an initial code such as "9" or an "*" may be required as a header code to alert the intercom system that a sequence of numbers is to follow.

The signal is then sent to a switch box, referred to as an apartment commuter 16, to connect with the desired apartment station. The apartment commuter 16 is a switching device which connects a user in communication with the entrance panel 10 with one particular apartment. The apartment commuter 16 then sends the signal to a door comparator 18, a talk/listen comparator 20, and a relay 22. After going through the relay, the signal is sent to an amplifier 26. The amplifier 26 turns on a two way speaker 14 or handset on the entrance panel 10 and connects it with the apartment station 28 by sending a tone generator ring up signal 30 to the apartment station 28. Two way communication between the user and the resident is thus established.

The resident communicates with the user by depressing the talk/listen push button on the apartment station. When the talk/listen push button is depressed the resident can talk down to the lobby. When the talk/listen push button is released the user can talk up to the resident. The resident can upon verifying the identification of the user, depress the door push button on the apartment station to activate an electronic release of the lobby door of the apartment building via a door lock control unit 32. Once the resident depresses the door push button on the apartment station, a signal is sent from the apartment to a door comparator 18 and on to a timer 24. The timer 24 begins a timed countdown which continues until the countdown is completed. Then the signal is sent to a door lock control unit 32 which releases the lobby door for the user. If the door push button in any of the apartments were to get stuck, the door comparator 18 in this apartment station will not connect this apartment to the timer and all intercom systems will operate normally.

Figure 2:
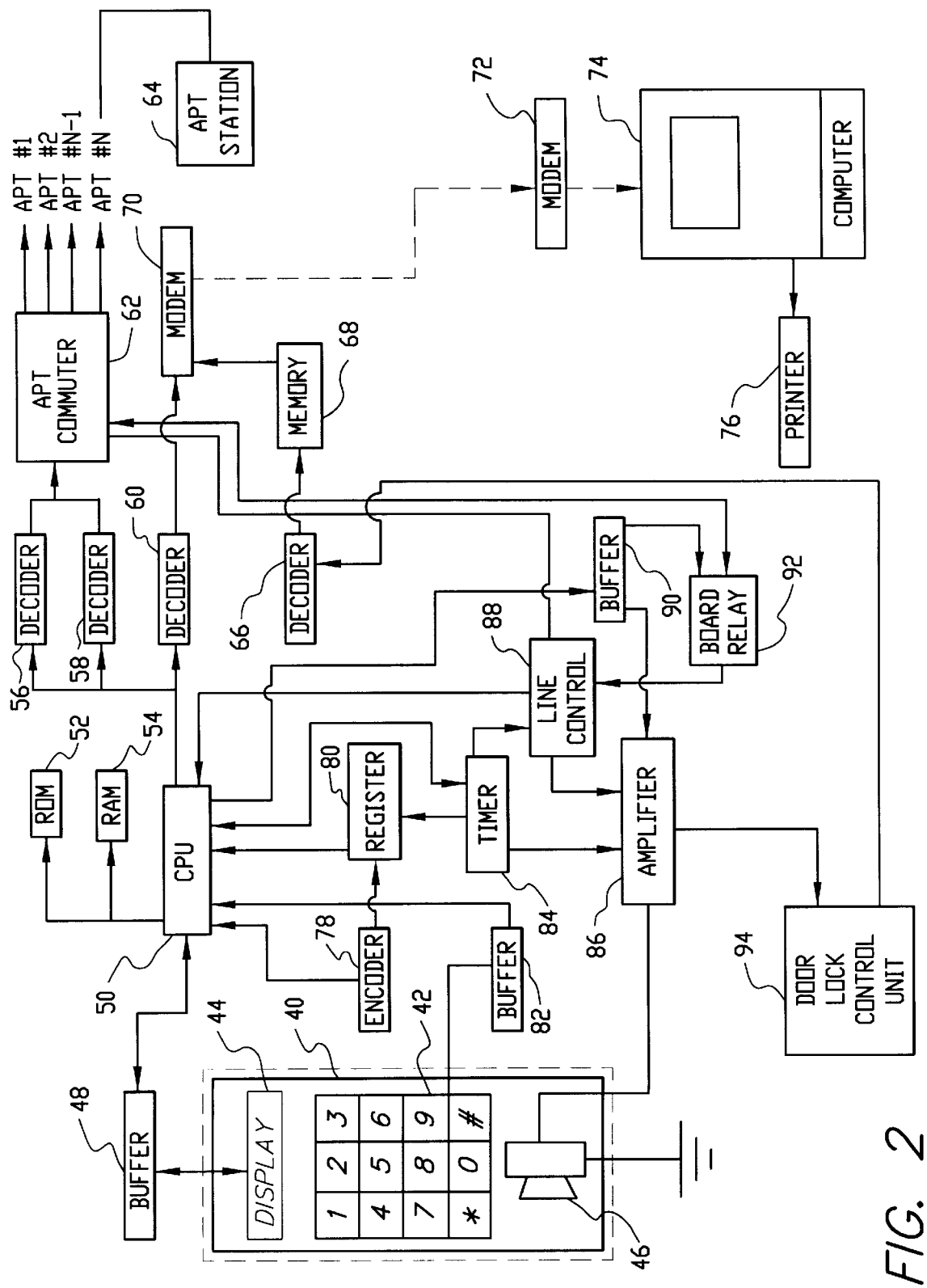
FIG. 2 is a block diagram of a fully automatic intercom system according to the present invention.
Figure 3:
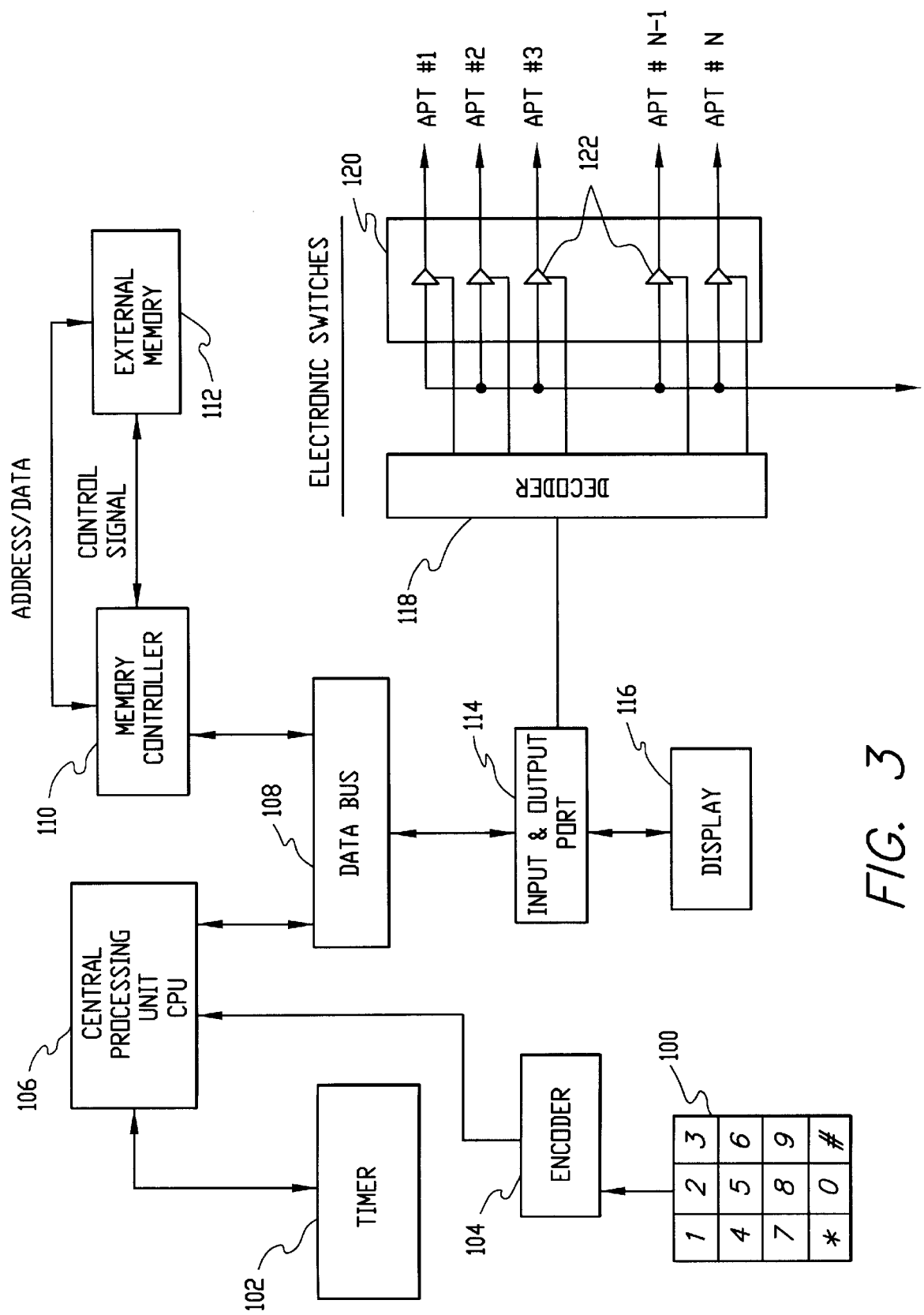
FIG. 3 is a block diagram of a fully automatic intercom system according to the invention showing the operation of a display enhanced entrance panel and a control system for connecting the entrance panel with an indivdual apartment.

FIG. 2 shows in block diagram format an electronics circuit for a hardwired fully automatic intercom system according to the invention which alternatively links an entrance panel 10 with an array of apartments. Each apartment has an apartment station 28 which is either a wall mounted intercom speaker apartment station unit or a handset apartment station unit. In either case, the apartment station unit is hardwired into the intercom system. The entrance panel 40 is provided with a keypad 40, a display 44, and a speaker 46. The use of the display 44 is optional and is not required. Preferably, such a display 44 is a liquid crystal diode display which shows relevant information concerning the intercom transmission. The displayed information may relate to either the numbers depressed, instructions on how to use the intercom, or to the status of the intercom system, including "busy", "answering", "on line", or "out of order" messages. The display 44 may also be used to display a listing of the tenants alphabetically or by apartment number with the corresponding intercom code to be entered into the keypad.

The speaker 46 is shown as a two way speaker, but could also be any electronic sound conversion means including a separate speaker and microphone which can convert sound to electric signals and convert electric signals into sound. For electrical considerations, the component chosen for the speaker should be selected with the regard to the apartment station in use. The speaker 46 in the entrance panel and the speaker in the apartment station are both hardwired intercom speaker units.

To connect the entrance panel 40 with an apartment station, according to the present invention, a user depresses numbers on the keypad 42 which correspond to a particular apartment to initiate the intercom system. The numbers which the user enters into the system may be either the apartment number itself, or a published code number which has a one to one correspondence with a particular apartment. If the intercom has a "sleep" mode, where the intercom is normally dormant to reduce the power consumption of the intercom system, an initial code such as "9" or an "*" may be required as a header code to alert the intercom system that a sequence of numbers is to follow.

The signal is then sent to a key pad buffer 82 and subsequently to a central processing unit (CPU) 50. The CPU 50 controls a read only memory (ROM) 52 and a random access memory (RAM) 54. The CPU 50 also interacts with a display buffer 48, an encoder 78, the key pad buffer 82, a register 80, a timer 84, a line control 88, a buffer 90, and three decoders 56,58,60. The signal depressed on the keypad 40 is encoded by the encoder 78 and sent to the CPU 50 and the register 80. The CPU 50 sends the encoded signal to decoders 56,58,60 located in a central apartment office.

These decoders decode the signal and operationally activate an apartment commuter 62 to communicate with the entrance panel and with one particular apartment station 64. The apartment commuter 62 is a switching device which connects a user in communication with the entrance panel 40 with an apartment station 64. The apartment commuter 62 then sends the signal through a door comparator 18, a talk/listen comparator 20, and a relay 22. After going through the relay, the signal is sent to an amplifier 26. The amplifier 26 turns on a two way speaker 14 or handset on the entrance panel 10 and connects it with the apartment station 28 by sending a tone generator ring up signal 30 to the apartment station 28. Two way communication between the user and the resident is thus established.

The resident communicates with the user by depressing a talk/listen push button on the apartment station. When the talk/listen push button is depressed the resident can talk down to the lobby. The talk/listen push button is released the user can talk up to the resident. The resident can upon verifying the identification of the user, depress a door push button on the apartment station to activate an electronic release of the lobby door of the apartment building via a door lock control unit 32. Once the resident depresses the door push button on the apartment station, a signal is sent from the apartment to a door comparator 18 and on to a timer 24. The timer 24 begins timed countdown which continues until the countdown is completed then the signal is sent to a door lock control unit 32 which releases the lobby door for the user. If the door push button in any of the apartments were to get stuck, the comparator in this apartment station will not connect this apartment to the timer and all intercom systems will operate normally. Once the door lock control unit is activated a signal is sent from the door lock control unit to a decoder 66 and subsequently to a memory 68. A modem electrically connected to the memory transmits data stored in the memory 68 to a computer 74. The central office may then generate a listing of the apartment building activity via printer 76.

Analogous to FIG. 2, a key pad 100 according to a second embodiment of the invention emits a tone to encoder 104 corresponding to the key number pressed on the key pad 100. The encoder converts the tone into a bitstream representing the code (i.e., key number) typed on the key pad 100. The encoder 104 sends the converted signal to an input/output port 114. A data bus 108 in communication with the input/output port 114 sends the bitstream from the input/output port 114 to the CPU 106 and to the memory controller 110.

The memory controller 110 controls a programmable external memory bank 112 containing a table of numbers to correlate keypad entered codes with apartment switching sequence codes. The "incoming code" number, the bitstream code, is converted by the CPU 106 to an "outgoing code" number, the apartment switching sequence bitstream code, according to the data contained in the table in the external memory 112. The outgoing code is sent back through the data bus 108 to the input/output port 114.

The CPU 106 also concurrently controls a display 116 associated with the entrance panel to provide the user with relevant information as discussed above, related to the use or operation of the entrance panel. The CPU 106 retrieves information from the external memory 112 related to either the keycode dialed into the key pad 100 (and received by the CPU 106 as a bitstream data through the data bus 108 or related to the condition of the apartment commuter 120 such as "BUSY" or "ANSWERING."

The output code from the input/output port 114 is sent to the decoder 118 and converted to an electronic switching code to activate the bank of electronic switches in the apartment commuter 120. The signal causes one individual switch 122 to switch to "ON" and the remaining switches to remain "OFF." The activated switch 122 connects an apartment to a bridge which is connected to a speaker or handset at the entrance panel, allowing communication between the user at the entrance panel and the apartment resident.

A timer 102 is connected to the keypad 100 by a line. The timer 102 is initiated by activation of the key pad 100 and sends a signal to the CPU 106 when a preset time period has elapsed. The CPU 106 then causes a shutdown signal to be sent to the switching unit to disconnect the apartment and the vestibule panel. The CPU 106 then send a "TIME OUT" message to the display 116 to inform the user of the disconnect.

Accordingly, it is to be understood that the present invention is not limited to the embodiments described above, but encompasses any and all embodiments within the scope of the following claims.

I claim:

1. A semi-automatic intercom system comprising:
   an electrical circuit;
   an entrance panel electrically coupled to said electrical circuit via a non-telephone line;
   a commuter electrically coupled to said electrical circuit via a non-telephone line;
   a plurality of apartment station units hardwired to the entrance panel via non-telephone lines, wherein each apartment station unit includes a door push button and a talk/listen push button;
   an amplifier electrically coupled to said electrical circuit via a non-telephone line;
   a door comparator electrically coupled to said electrical circuit via a non-telephone line;
   a talk/listen comparator electrically coupled to said electrical circuit via a non-telephone line;
   a relay electrically coupled to said electrical circuit via a non-telephone line;
   a tone generator electrically coupled to said electrical circuit via a non-telephone line; and,
   a door lock control unit electrically coupled to said electrical circuit via a non-telephone line.

2. A semi-automatic intercom system according to claim 1, further comprising a timer electrically coupled to said electrical circuit via a non-telephone line.

3. A fully automatic intercom system comprising:
   an electrical circuit;
   an entrance panel electrically coupled to said electrical circuit via a non-telephone line;
   a commuter electrically coupled to said electrical circuit via a non-telephone line;
   a plurality of apartment station units hardwired to the entrance panel via non-telephone lines, wherein each apartment station unit includes a door push button and a talk/listen push button;
   a central processing unit electrically coupled to said electrical circuit via a non-telephone line;
   an encoder electrically coupled to said electrical circuit via a non-telephone line;
   a decoder electrically coupled to said electrical circuit via a non-telephone line;
   a register electrically coupled to said electrical circuit via a non-telephone line;
   a board relay electrically coupled to said electrical circuit via a non-telephone line; and,
   a door lock control unit electrically coupled to said electrical circuit via a non-telephone line.

4. A fully automatic intercom system according to claim 3, further comprising a timer electrically coupled to said electrical circuit via a non-telephone line.

5. A fully automatic intercom system according to claim 3, further comprising a random access memory electrically coupled to said electrical circuit via a non-telephone line.

6. A fully automatic intercom system according to claim 3, further comprising a read only memory electrically coupled to said electrical circuit via a non-telephone line.

7. A fully automatic intercom system according to claim 3, further comprising a modem electrically coupled to said central processing unit via a non-telephone line.

* * * * *